US005588659A

United States Patent [19]

Boes et al.

[11] Patent Number: 5,588,659

[45] Date of Patent: Dec. 31, 1996

[54] TOOL CART

[75] Inventors: James A. Boes; Chad W. Boes; Douglas W. Boes, all of Sullivan, Ind.

[73] Assignee: Triple B Trenching, Inc., Sullivan, Ind.

[21] Appl. No.: 412,569

[22] Filed: Mar. 29, 1995

[51] Int. Cl.$^{6}$ ........................................ B62B 1/00

[52] U.S. Cl. ........................ 280/47.19; 280/47.35; 312/902; 211/70.6; 206/378

[58] Field of Search ........................ 280/47.19, 638, 280/35, 651, 47.11, 47.34, 47.35, 47.26; 312/249.8, 249.14, 299.12, 902, 324, 284, 328, 140.3; 211/70.6, 70.7, 150, 168, 169; 206/373, 376, 378; 301/113, 125

[56] References Cited

U.S. PATENT DOCUMENTS

| | | | |
|---|---|---|---|
| 592,177 | 10/1897 | Stutsman | 280/47.19 |
| 2,364,246 | 12/1944 | Shaver et al. | 280/47.26 |
| 2,525,208 | 10/1950 | Clink | 280/47.35 |
| 2,905,480 | 9/1959 | Giovannelli | 280/34 |
| 2,933,360 | 4/1960 | Sitler | 312/140.1 |
| 2,964,328 | 12/1960 | Muir | 280/47.19 |
| 3,118,685 | 1/1964 | Jordan | 280/47.19 |
| 4,120,549 | 10/1978 | Bureau | 280/47.35 |
| 4,179,132 | 12/1979 | Rich | 280/47.26 |
| 4,281,843 | 8/1981 | Johnson et al. | 280/47.26 |
| 4,305,510 | 12/1981 | Eppy | 211/169 |
| 4,337,860 | 7/1982 | Carrigan | 211/70.6 |
| 4,460,085 | 7/1984 | Jantzen | 312/902 |
| 4,976,450 | 12/1990 | Ellefson | 280/79.11 |
| 5,013,055 | 5/1991 | Labrum | 280/47.19 |
| 5,215,366 | 6/1993 | Givens | 312/351.3 |
| 5,221,132 | 6/1993 | Combs et al. | 211/70.6 |
| 5,224,531 | 7/1993 | Blohm | 312/249.12 |
| 5,378,005 | 1/1995 | Norton | 280/47.26 |

FOREIGN PATENT DOCUMENTS

| | | | |
|---|---|---|---|
| 625893 | 8/1961 | Canada | 211/150 |

*Primary Examiner*—Anne Marie Boehler
*Assistant Examiner*—Min Yu
*Attorney, Agent, or Firm*—Jacobson, Price, Holman & Stern, PLLC

[57] ABSTRACT

A tool cart generally in the form of an upright stand provided with unique tool supports to enable a large number of tools to be supported in an accessible position. The tool supports are pivotally and separably supported to enable the tools to be easily carried to a work site. The stand includes a pair of removable wheels which do not engage a supporting surface when the stand is upright but do engage a supporting surface when the stand is tilted to provide a mobile cart that can be easily moved to a site of use of the tools supported by the cart.

15 Claims, 4 Drawing Sheets

TOOL CART

BACKGROUND OF THE INVENTION

1. Field of the Invention

This invention relates to a tool cart generally in the form of an upright stand provided with unique structural features to enable a large number of tools to be supported in an accessible position. The stand includes a pair of wheels which do not engage a supporting surface when the stand is upright but do engage a supporting surface when the stand is tilted to provide a mobile cart that can be easily moved to a site of use of the tools supported by the cart.

2. Description of the Prior Art

Tool cabinets, carts, caddies and stands are generally well known and include features to support a plurality of tools in a position to enable easy access to the tools by a mechanic or other person engaged in activities which require the use of selected tools. Tool cabinets and similar tool supporting devices are frequently provided with caster wheels or other supporting wheels to enable the cabinet, cart, caddie or the like to be moved to a site of use.

The following U.S. patents disclose devices which relate to the subject matter of this application.

U.S. Pat. No. 2,905,480

U.S. Pat. No. 2,964,328

U.S. Pat. No. 3,118,685

U.S. Pat. No. 4,179,132

U.S. Pat. No. 4,281,843

U.S. Pat. No. 4,976,450

U.S. Pat. No. 5,013,055

U.S. Pat. No. 5,378,005

Giovannelli U.S. Pat. No. 2,905,480 discloses a two wheeled cart with a handle structure and including front doors and top panels to provide access to a plurality of compartments. Muir U.S. Pat. No. 2,964,328 discloses a tool cart generally in the form of a hand truck with a cabinet mounted between the handles and provided with pivotal doors to provide access to the interior of the cabinet with hand tools being supported by hooks in the cabinet. Jordan U.S. Pat. No. 3,118,685 discloses a mobile tool chest with multiple compartments with an access door. Rich U.S. Pat. No. 4,179,132 discloses a hand truck with a supporting structure at the upper end thereof. Johnson et al. U.S. Pat. No. 4,281,843 discloses a tool carrier supported by two wheels and a supporting leg structure with multiple tool receptacles and tool supporting structures oriented vertically and attached to a frame. Ellefson U.S. Pat. No. 4,976,450 discloses a cart or chest having a plurality of attachments including pivotal doors and swingable tray-like structures pivoted at corner portions of the cart. Labrum U.S. Pat. No. 5,013,055 discloses a tool cart having a cabinet provided with a pivotal access door with supporting structure within the cabinet for supporting a plurality of tools. Norton U.S. Pat. No. 5,378,005 discloses a tool cart provided with outwardly swingable doors with the doors and interior of the cart including structures for supporting various tools.

The above listed and discussed patents do not disclose a tool cart incorporating the unique features of this invention.

SUMMARY OF THE INVENTION

An object of the present invention is to provide a tool cart generally in the form of an upright stand incorporating a work bench and supporting structures for a large number of tools, repair parts and the like.

Another object of the invention is to provide a tool cart in the form of a stand as defined in the preceding object with the stand including a pair of wheels at one edge thereof and a handle oriented at the upper end of the stand at the same edge as the wheels to enable the cart to be tilted and rolled to a site of use.

A further object of the invention is to provide a tool cart in accordance with the preceding objects in which the supporting wheels are oriented slightly above the plane of the lower end of the stand whereby the stand will be supported on its own legs when in upright position and supported by the wheels when tilted in the direction of the wheels and handle.

Still another object of the invention is to provide a tool cart in accordance with the preceding objects in which the wheels are removably attached to the stand to enable the stand to be stationarily supported in some use environments.

Yet another object of the invention is to provide a tool cart in accordance with the preceding objects in which the tool supporting structures include an upright frame structure at one edge of the stand with supporting structures provided thereon for tools together with pivotal and removable wings for supporting a plurality of tools with the wings being removed from the stand to be carried to a work site if the tool cart is not required at the work site.

Another significant object of the invention is to provide a tool cart in accordance with the preceding objects in which the frame portion of the stand extending above the work bench is provided with a removable and lockable cover to prevent the tools from being removed by unauthorized persons.

Another important object of the invention is to provide a tool cart in accordance with the preceding objects in which the stand is provided with a supporting tray or shelf underlying the work bench provided with a lockable closure door and provided with drawers below the work bench to provide additional storage space for tools, parts and the like.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
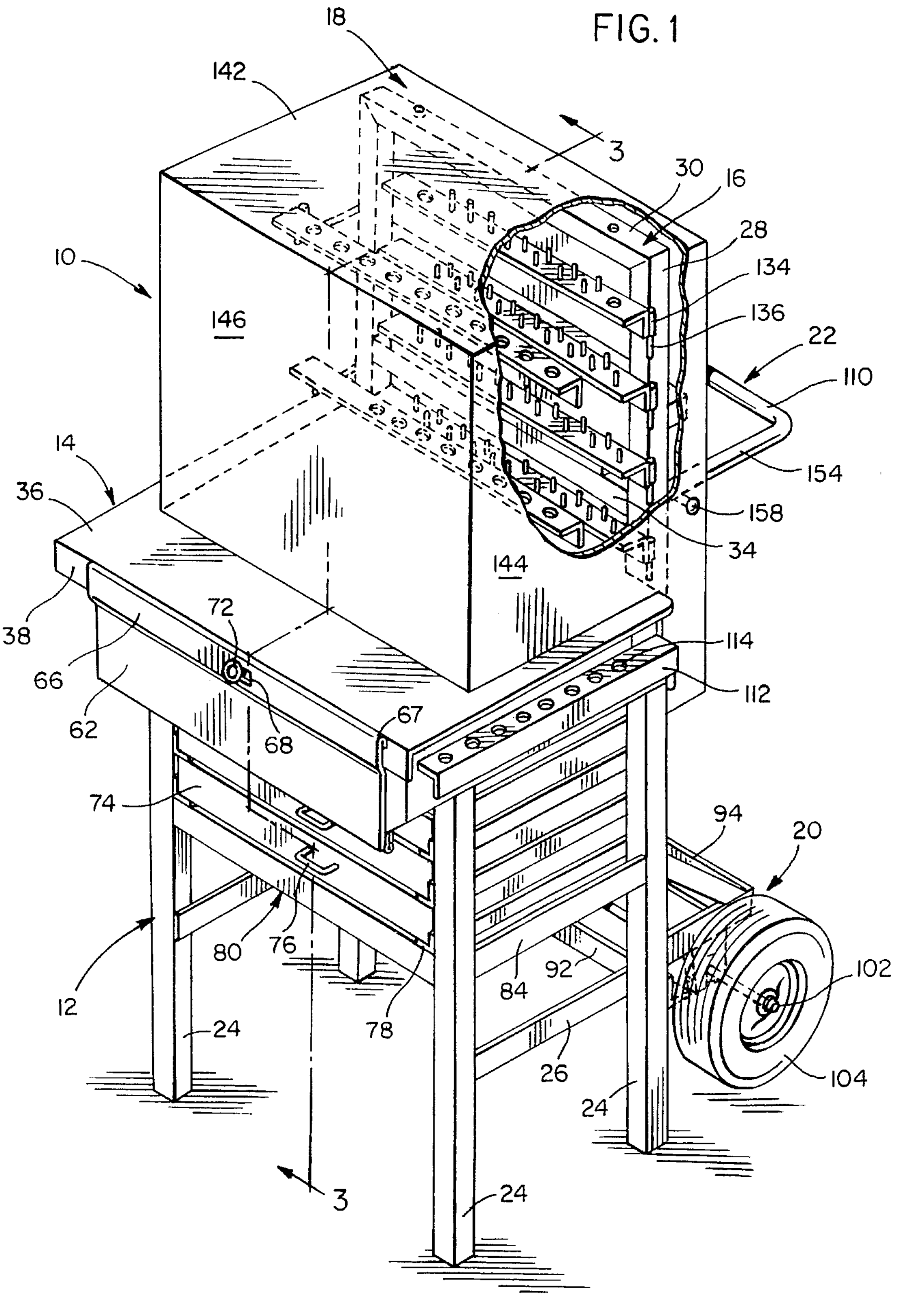
FIG. 1 is a front perspective view of the tool cart with portions of the protective cover broken away to illustrate the tool supporting structure mounted on the frame above the work bench.

The tool cart of this invention is generally designated by reference numeral 10 and includes a generally vertically oriented upright stand 12 having a generally horizontal work bench 14 at its upper end, a vertically extending frame 16 at the rear edge of the work bench, a protective cover assembly 18 overlying the frame 16 and a portion of the work bench, a wheel assembly 20 at the lower rear of the stand and a handle assembly 22 on the frame 16 above the work bench.

The stand 12 includes four vertically disposed legs 24 defining the corners of the stand with the legs being rigidly interconnected by horizontally disposed braces 26. The legs and braces can be constructed of suitable structural members with the legs preferably being hollow tubular metal members of square or rectangular configuration and the braces 26 preferably being metal straps, angle irons or the like. The rear pair of legs 24 extend above the work bench 14 with the upper portions of the legs 24 being designated by reference numeral 28 and forming the frame 16. The upper ends of the upper leg portions 28 are interconnected by a frame member 30 which is also a tubular structural member thus forming a rigid stand with the frame 16 forming a continuation of the rear legs 24 as illustrated in the drawings. The upper leg portions 28 are also interconnected by frame members 32 and 34 which are vertically spaced in relation to each other and spaced vertically above the work bench 14.

Figure 4:
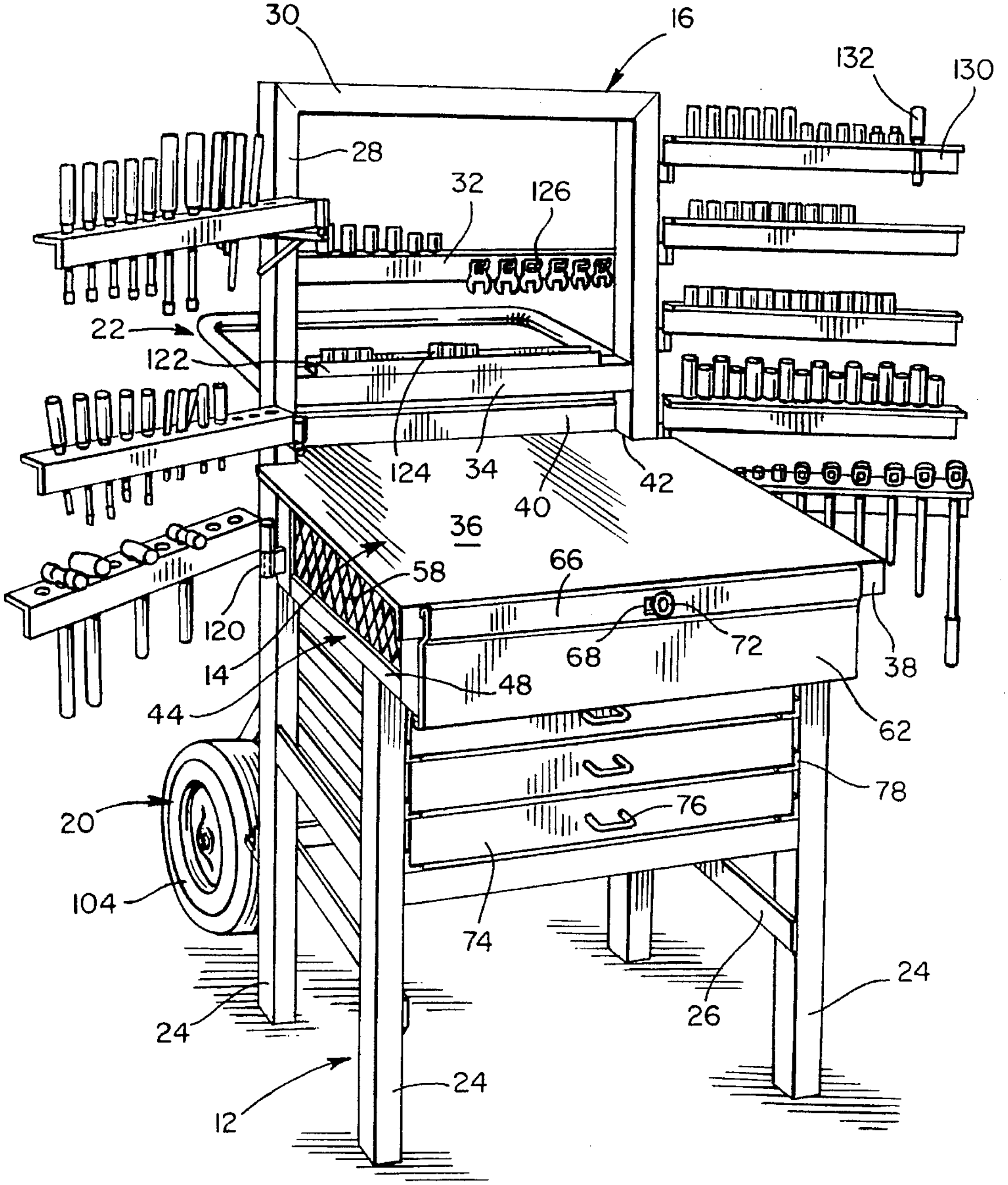
FIG. 4 is a front perspective view of the tool cart illustrating the tool supporting wings pivoted to an outwardly extending position.

The work bench 14 is a substantially flat metal panel 36 having a short downturned front edge 38 and a short upturned rear edge 40 secured between and secured to the inner surfaces of the upper leg portions 28. The side edges of the panel 36 extend beyond the side legs 24 and the front edge of the panel 36 beyond the front legs 24 of the stand 12. The manner in which the rear corners of the panel 36 are associated with the upper leg portions of the stand is illustrated in FIG. 4 with the panel 36 including notches 42 extending around and secured to the upper leg portions 28. The work bench panel 36 is supported by a subframe 44 including upper side frame members 46, lower side frame members 48 parallel to the frame members 46 and in vertically spaced relation thereto. The rearward ends of the frame members 46 and 48 are rigidly connected to the upper leg portions and the forward ends of the frame members 46 are interconnected by short vertical front frame members 50. The forward ends of the upper side frame members 46 are interconnected by a front horizontal frame members 52 which underlies the panel 36 inwardly of the downturned front edge 38. The forward ends of the lower frame members 48 are interconnected by a lower front frame member 54 which includes a downturned front flange. Thus, the subframe 44 defines a generally rectangular frame structure underlying the panel 36 and rigidly secured to the legs 24 and the upper leg portions 28. The area defined by the subframe 44 below the work bench panel 36 includes a bottom panel 56, side panels 58 and a rear panel 60 constructed of expanded metal to define a compartment that is open at the front. The expanded metal provides for air passage and observation of the interior of the compartment. In lieu of using expanded metal, solid metal panels may be utilized to close the side, rear and bottom of the compartment.

Figure 3:
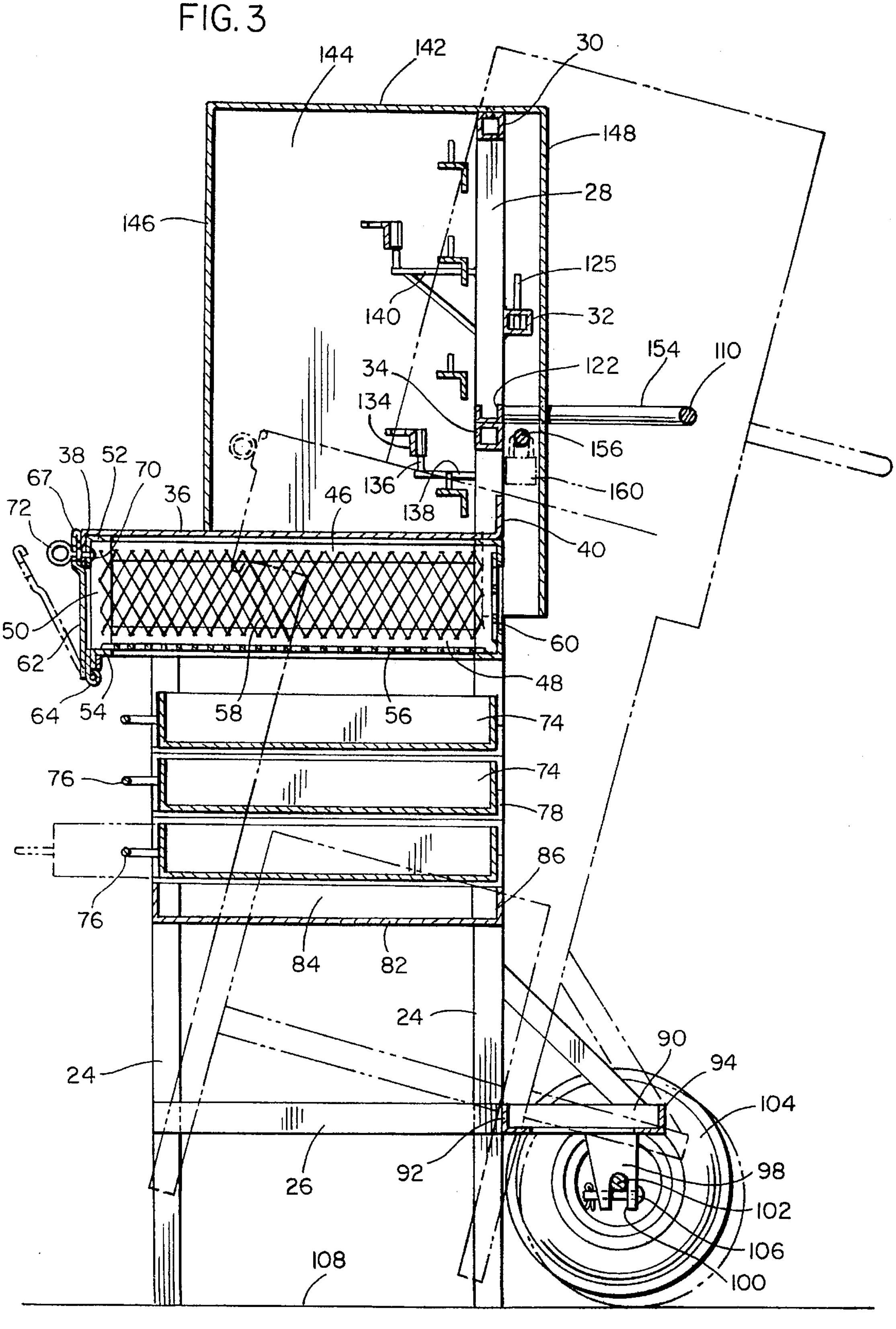
FIG. 3 is a vertical sectional view taken substantially upon a plane passing along section line 3—3 on FIG. 1 illustrating further structural details of the invention including a broken line illustration of the manner in which the cart can be tilted and rolled along a supporting surface.

The front of the compartment under the work bench panel 36 is provided with a closure door 62 having its lower edge extended downwardly alongside of the depending flange of the frame member 54 and being hingedly attached thereto by a hinge 64. The upper edge of the door 62 includes a forwardly offset flange 66 with a reverse bent upper edge 67 oriented in front of the depending front flange 38 on the work bench panel 36 as illustrated in FIGS. 1, 3 and 4. The flange 66 is provided with a slot 68 centrally located therein for receiving a twist lock 70 mounted on the frame member 50 or flange 38 with the twist lock 70 including an eye 72 which can be horizontally oriented for positioning through the slot 68 to enable the door 62 to move to a closed or open position with the twist lock 70 securing the door 62 in closed position when the eye 72 is turned to vertical position.

Positioned below the work bench and below the bottom wall 56 is a plurality of drawers 74 each of which includes a loop handle 76 centered on the front wall thereof and supported by front-to-rear guide and supporting rails 78 secured to the legs 24 of the stand 12. The guide and supporting rails and the drawers include a structure to prevent the drawers from being inadvertently pulled completely out of the supporting and guide rails. Below the lower most drawer 74, a tray structure 80 is mounted which includes a bottom wall 82, side walls 84 and a rear wall 86 with the front of the tray being open to enable items to be stored thereon or removed by moving such items through the open front of the tray.

The wheel assembly 20 includes a supporting frame structure 88 including side frame members 90 attached to a transverse angle iron brace member 92 with the side frame members 90 being connected at their rearward ends by a transverse frame member 94. Inclined brace members 96 interconnect the rear edges of the side frame members 90 and the legs 24 at a point above the brace 92 and below the tray 80. A depending bracket 98 is mounted at each side of the rear of the frame 88 with the bottom end of each bracket including a downwardly opening slot 100 which receives an elongated axle 102 therein. Each end of the axle 102 is provided with a wheel 104. The axle 102 is retained in the slots 100 in the brackets 98 by a removable retaining pin 106 extending across the lower end of the slot, below the axle, as illustrated in FIG. 3. Thus, by removing the two pins 106, the axle 102 and the wheels 104 may be separated from the stand.

The wheels 104 are spaced slightly above a supporting surface 108 when the lower ends of the legs 24 are engaging the supporting surface with the stand in an upright position. Thus, when the cart is oriented with the stand in the upright position, it is supported on all four legs with the two wheels 104 spaced above the supporting surface. This structure enables the user to perform rather heavy work on the work bench without damaging the wheels and axle and without the work bench and stand moving in relation to the supporting surface which may be the floor of a work area. With the cart in the vertical position, the wheels and axles can be easily removed by removing the pins. This prevents any unwanted and unexpected movement of the cart by other people in the area without the consent and knowledge of the user. When the wheel assembly is in place, the cart can be easily moved over unpaved areas or surfaces by tilting the cart to the broken line position illustrated in FIG. 3 at which point the wheels and tires 104 enable the cart to be rolled to a desired site of use.

The handle assembly 22 for the cart which enables it to be tilted and rolled to a desired position is in the form of a generally horizontally disposed U-shaped rod 110 that is rigidly affixed to the upper leg portions 28 at a point slightly above the transverse frame member 34 as illustrated in FIG. 3. The U-shaped handle 110 is at a convenient elevation to enable a person to grasp the handle 110, tilt the cart to the broken line position illustrated in FIG. 3 and then roll the cart to a desired location in a manner similar to a hand truck.

The cart 10 includes a plurality of structures for supporting a large number of tools. At each side of the work bench 14, an elongated tool support 112 is supported at its rearward end. The tool support 112 is an angle iron member having a plurality of spaced apertures 114 in the top, inwardly extending flange. The tool holder 112 is pivotally supported at its rearward end for movement between a position generally underlying the edge of the panel 36 to an outward angulated position as illustrated in FIG. 4. To support the tool holder 112, a support bracket 116 is mounted on the leg 24 with the bracket including a vertical sleeve 118 receiving a depending pin 120 rigid with the rear inner corner of the tool support 112. The pin 120 is rotatable and also vertically removable from the sleeve 118 to enable the tool holder to be removed and carried to a site of us. The tool holder 112 is duplicated at each side of the cart and the apertures enable the handles of various types of tools to be inserted downwardly therethrough for supporting the tools in an accessible and observable position for easy access.

Mounted along the upper surface of the frame member 34 is a channel shaped tool holder 122 which opens upwardly and is adapted to receive a plurality of sockets 124 with the channel shaped member 122 preferably being in the form of a tool clip to retain a plurality of sockets therein. The upper frame member 32 is oriented to the rear side of the upper leg portions and is provided with a plurality of upwardly extending pegs or pins 125 for supporting sockets thereon and also may be provided with hook shaped members 126 to hang tools therefrom.

Each side of the frame 16 is provided with a plurality of tool supports 130 having apertures or hooks receiving various tools 132 with the rearward end of each support including a depending sleeve 134 engaged with a vertical pin 136 rigid with the upper leg portions 28 to enable the tool supports 130 to be pivoted outwardly to an angulated position illustrated in FIG. 4 or positioned transversely of the frame 16. Certain of the supporting pins 136 are supported from the upper leg portion by forwardly extending brackets 138 or 140 as illustrated in FIGS. 3 and 4 which are oriented to the left side of the cart to orient the holders at different positions with respect to the frame 16 and with respect to the front of the work bench thereby providing a tiered arrangement of tool holders to facilitate access to the tools.

The tool holders may be constructed with various arrangements for supporting the tools such as upstanding pins for supporting sockets with the pins being of various lengths depending upon the length of the sockets. The tool holders may be provided with a plurality of apertures of different sizes and arrangements to receive the handles of various tools. Also, the tool supports may include slots in the upper surface, hooks on the forward surface or an upturned forward edge with a plurality of notches to receive tools such as hammers and the like and any combination or variation thereof. Also, the top frame member 16 may have a tool support bolted thereto with forwardly extending hooks being provided along the forward surface of the tool holder. Also, either or both sides of the work bench may have a stationary tool holder mounted along the subframe just below the work bench panel 36 rather than the pivotal supports 112 or there may be a pivotal support on one side and a stationary support or partial support on the other side.

Figure 2:
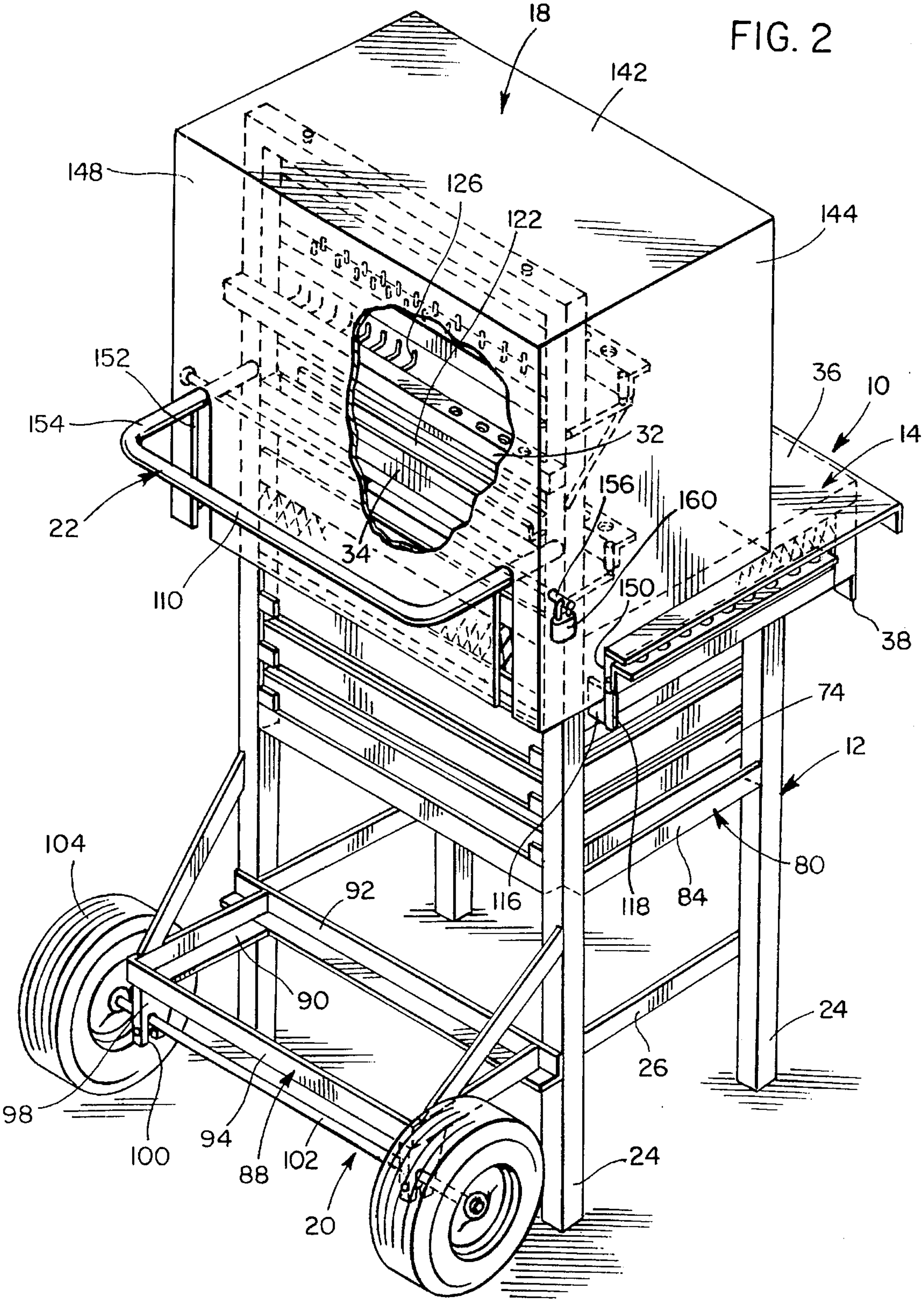
FIG. 2 is a rear perspective view of the tool cart with portions of the protective cover broken away.

The protective cover assembly 18 is in the form of a hollow box-like structure provided with a top wall 142, side walls 144, a front wall 146 and a rear wall 148 with all of the walls being of one-piece construction to form a one-piece cover. The side walls 142 have a notch 150 formed in their rear edge portion to extend downwardly alongside the rear edge of the outer side edge portions of the panel 36 as illustrated in FIG. 1 thus enabling the bottom edge of the front wall and the bottom wall of the major portions of the side walls to rest on and engage the work bench panel 36 to completely enclose the frame 16 and all of the tool holders mounted on the upper leg portions 28. The rear wall 148 is positioned rearwardly of the upper leg portions 28 and include parallel vertical slots or notches 152 which receive the leg portions 154 of the U-shaped handle 110 as illustrated in FIG. 2 to enable the cover assembly 18 to move downwardly into a protective relation to the various tool holders supported from the frame 16 and any items on the work bench panel 36.

The protective cover assembly 18 can be locked in enclosing relation to the tool holders by the provision of an elongated horizontally disposed rod 156 extending through the side walls 144 at a point adjacent the rear wall 148 and a point below the upper ends of the notches 152 and below the legs 154 of the handle 110 thus preventing upward movement of the protective cover assembly 18 when the rod 156 is in position. One end of the rod is headed at 158 and the other end extends beyond the opposite wall 144 and is provided with a pad lock 160 in which the hasp of the lock extends through a transverse aperture in the end of the rod 156 which projects beyond the side wall 144 as illustrated in FIG. 2.

The protective cover assembly 18 is preferably constructed of fiberglass reinforced plastic and may be either opaque, translucent or transparent to enable observation of the tools if desired. The cover assembly provides a lockable protective cover to prevent unauthorized use of the tools and any tools on the side tool holders adjacent the edge of the work bench may be positioned on the panel 36 within the confines of the protective cover if desired. The protective cover may be easily removed by removing the lockable rod and can be easily locked in place.

The tool holders can be easily pivoted to a retracted or collapsed position or to an extended position and they can be easily removed and carried to a work site in the event the tool cart may not be required. The tool cart can be moved to a desired position with the tool holders or wings in collapsed or folded out position and the tool holders are capable of holding approximately 250 tools. Parts trays or parts can be stored in the compartment under the bench or in the tray and the tool drawers can be used for storage of tools or parts. Also, the frame 85 for the wheels can be constructed to carry numerous items such as cutting torch tanks, a tool box, a generator or similar items.

The tool cart is constructed with a total height of approximately 60 inches, a width of approximately 30 inches and depth of approximately 36 inches in order that the tool cart can be easily moved through standard sized doors. When the tools are mounted on the cart, they can easily be accounted for and recognized and all tools are easily accessible and standard and metric tools can be placed on the cart according to the preference of the user without modification of the tool holders. If desired, the major components of the stand and frame may be assembled with bolts and nuts to enable it to be disassembled for ease of transport or the device may be constructed in three sections with a minimum number of bolts connecting the sections to facilitate assembly and disassembly as desired. The frame components, drawers, drawer slides and other major components are individually well known and conventional. However, the assembly of the components is unique and the tool supports and the manner of pivotally supporting and removably supporting the tool supports is unique along with the orientation of the wheels in relation to the lower ends of the stand legs and the detachable connection of the wheel assembly provide a unique association of components to enable the tool cart to be used with or without the wheels to facilitate movement of the tool cart to a site of use.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A tool cart comprising an upright stand, a work bench mounted on the upper end of the stand, an upright frame extending upwardly from the stand at one edge of the work bench, storage means supported from said stand and accessible from an edge of the work bench opposite to said frame, first tool supporting means mounted on said stand adjacent the work bench and second tool supporting means mounted on said frame above the work bench, said second tool supporting means mounted on said frame including a plurality of elongated members, each of said elongated members having pivotal connection at one end thereof with said frame to enable the elongated members to swing to various angular positions in relation to the frame, work bench and stand, said stand including corner legs, a pair of wheels mounted on said legs on the side of the stand having the frame mounted thereon, a support for said wheels extending laterally from the stand and including brackets supporting the wheels, said wheels being mounted on the legs in spaced relation to a support surface when the stand is supported on said legs, a handle mounted on said frame above the work bench and extending laterally in the same direction as the wheel support to enable the stand, work bench and frame to be tilted by exerting lateral pressure on the handle to engage the wheels with the supporting surface and elevate the legs above the supporting surface to enable the cart to be rolled to a use site.

2. The tool cart as defined in claim 1 wherein said wheels are interconnected by an axle, said wheel support and axle being connected by a bracket adjacent each wheel, said brackets including a downwardly opening notch receiving said axle, each bracket including a removable pin extending across said notch below the axle to separably support the axle to enable assembly and disassembly of the wheels in relation to the cart.

3. The tool cart as defined in claim 1 wherein said storage means is below the work bench and includes a plurality of slidable drawers mounted on the stand, a supporting shelf oriented above the drawers and in spaced relation below the work bench to provide a storage area, a closure door pivotally connected to the shelf along one edge thereof, the other edge of the closure door extending alongside the edge of the work bench opposite to the frame and a retaining device securing the door releasably in closed position.

4. The tool cart as defined in claim 3 wherein said work bench includes a downturned edge opposite to the frame, the door including an offset upper edge portion overlying and engaging the downturned edge of said work bench.

5. A tool cart comprising an upright stand, a work bench mounted on the upper end of the stand, an upright frame extending upwardly from the stand at one edge of the work bench, storage means supported from said stand and accessible from an edge of the work bench opposite to said frame, first tool supporting means mounted on said stand adjacent the work bench and second tool supporting means mounted on said frame above the work bench, said second tool supporting means mounted on said frame including a plurality of elongated members, each of said elongated members having pivotal connection at one end thereof with said frame to enable the elongated members to swing to various angular positions in relation to the frame, work bench and stand, said work bench including side edge portions perpendicular to the edge having the frame associated therewith, said side edges extending beyond the stand, said first tool supporting means mounted on said stand being positioned in underlying relation to an extended side edge of the work bench, said first tool supporting means mounted on said stand including an elongated member, a pivotal and separable connection between the elongated member and stand at one end of the elongated member to enable the elongated member and tools supported thereon to be swung outwardly for access and removed from the frame for transport to a work site.

6. The tool cart as defined in claim 5 wherein said pivotal connection for each of the elongated members mounted on said frame includes a separable connection enabling the elongated members and tools supported thereon to be removed from the frame and carried to a work site.

7. The tool cart was defined in claim 6 wherein said separable connection includes a sleeve on the end of the elongated member and an upwardly extending pin rigidly connected to the frame to enable pivotal movement of the elongated member and separation of the elongated member by lifting the elongated member and the tools thereon upwardly off the pin.

8. The tool cart as defined in claim 6 wherein said elongated members supported on the frame are in vertically spaced relation, laterally extending brackets mounted on the frame to support certain of said elongated members laterally spaced from the frame to enable a large number of elongated members to be supported from the frame.

9. The tool cart as defined in claim 8 wherein said laterally offset elongated members are supported from the frame by laterally extending brackets with certain of the brackets being longer than the others.

10. The tool cart as defined in claim 2 wherein each of said elongated members includes a plurality of longitudinally spaced tool engaging structures incorporated therein.

11. The tool cart as defined in claim 10 wherein said tool engaging structures includes a plurality of upstanding pins.

12. The tool cart as defined in claim 10 wherein said tool engaging structures includes a plurality of apertures extending through a horizontal flange on the elongated member.

13. A tool cart comprising an upright stand, a work bench mounted on the upper end of the stand, an upright frame extending upwardly from the stand at one edge of the work bench, storage means supported from said stand and accessible from an edge of the work bench opposite to said frame, first tool supporting means mounted on said stand adjacent the work bench and second tool supporting means mounted on said frame above the work bench, said second tool supporting means mounted on said frame including a plurality of elongated members, each of said elongated members having pivotal connection at one end thereof with said frame to enable the elongated members to swing to various angular positions in relation to the frame, work bench and stand, a protective cover enclosing the frame and tool supporting means, said cover being an inverted, hollow box having a lower edge resting against the work bench, said cover including a generally vertical wall oriented along the frame and extending below the work bench along the side of the work bench having the frame extending upwardly therefrom.

14. The tool cart as defined in claim 13 together with a structure releasably securing the cover in place in enclosing relation to the tool supporting means on said frame, said structure including a laterally extending, U-shaped handle having leg portions secured to said frame and extending laterally therefrom, said wall of the cover extending along the frame including vertically elongated notches receiving the legs of said handle when the cover is placed in enclosing relation to the frame and said first tool supporting means, a rod extending through the cover below the legs of the handle adjacent the frame and a lock securing said rod in place to prevent upward movement of the cover in relation to the handle, frame and tool supporting means.

15. A tool supporting device comprising an upright supported frame, tool supporting means mounted on said frame, said tool supporting means mounted on said frame including a plurality of elongated members, each of said elongated members having a pivotal connection at one end thereof with said frame to enable the elongated members to swing to various angular positions in relation to the frame, said pivotal connection for each of the elongated members mounted on said frame including a separable connection enabling the elongated members and tools supported thereon to be remove from the frame and carried to a work site, said separable connection including a sleeve rigidly connected to the end of the elongated member and an upwardly extending pin rigidly connected to the frame to enable pivotal movement of the elongated member and separation of the elongated member by lifting the elongated member and the tools thereon upwardly off the pin, said elongated members being supported in vertically spaced relation, laterally extending brackets rigidly connected to the frame, said pins being rigidly connected to the brackets to support certain of said elongated members laterally offset from the frame and from the other elongated members to enable a large number of elongated members to be supported from the frame, certain of said laterally extending brackets being longer than the others to support certain of the elongated members in laterally spaced relation from the other elongated members, each of said elongated members having a plurality of longitudinally spaced tool engaging structures incorporated therein.

* * * * *